United States Patent

Hayes et al.

[11] Patent Number: 6,084,056
[45] Date of Patent: Jul. 4, 2000

[54] PROCESS FOR THE HYDROLYSIS OF ADIPONITRILE AND THE PRODUCTION OF NYLON 6,6 UTILIZING LOW CATALYST LEVELS

[75] Inventors: Richard Allen Hayes, Brentwood, Tenn.; David Neil Marks, Newark; Maria de Jesús Van Eijndhoven, Bear, both of Del.

[73] Assignee: E. I. Dupont de Nemours & Company, Wilmington, Del.

[21] Appl. No.: 09/217,799

[22] Filed: Dec. 22, 1998

[51] Int. Cl.⁷ .................................................. C08G 69/28
[52] U.S. Cl. ........................ 528/310; 528/312; 528/313; 528/315; 528/322; 528/323; 528/324; 528/332; 528/335; 528/336; 528/337
[58] Field of Search ........................... 528/310, 335, 528/323, 313, 312, 324, 336, 315, 322, 332, 337

[56] References Cited

U.S. PATENT DOCUMENTS

| | | |
|---|---|---|
| T875,023 | 6/1970 | Knowles et al. |
| 2,245,129 | 6/1941 | Greenewalt .................. 260/2 |
| 3,833,647 | 9/1974 | Gelebein et al. ............ 260/515 |
| 3,847,876 | 11/1974 | Onsager ...................... 260/78 |
| 3,922,147 | 11/1975 | Sze et al. ..................... 23/283 |
| 3,968,152 | 7/1976 | Sze et al. ..................... 260/515 |
| 4,214,087 | 7/1980 | Fannelli et al. ............. 546/319 |
| 4,436,898 | 3/1984 | Hofmann et al. ............ 528/336 |
| 4,490,521 | 12/1984 | Coffey et al. ................ 528/336 |
| 4,501,881 | 2/1985 | Greene et al. ................ 528/336 |
| 4,520,190 | 5/1985 | Coffey et al. ................ 528/336 |
| 4,528,362 | 7/1985 | Hoffmann et al. ........... 528/336 |
| 4,542,205 | 9/1985 | Curatolo et al. ............. 528/336 |
| 4,543,407 | 9/1985 | Curatolo et al. ............. 528/336 |
| 4,568,736 | 2/1986 | Curatolo et al. ............. 528/313 |
| 4,603,192 | 7/1986 | Coffey et al. ................ 528/336 |
| 4,629,776 | 12/1986 | Curatolo et al. ............. 528/313 |
| 4,640,976 | 2/1987 | Curatolo et al. ............. 528/336 |
| 4,689,394 | 8/1987 | Curatolo et al. ............. 528/336 |
| 4,719,285 | 1/1988 | Curatolo et al. ............. 528/336 |
| 4,725,666 | 2/1988 | Curatolo et al. ............. 528/336 |
| 4,732,965 | 3/1988 | Curatolo et al. ............. 528/336 |
| 4,734,487 | 3/1988 | Curatolo et al. ............. 528/336 |
| 4,739,035 | 4/1988 | Shyu et al. ................... 528/335 |
| 4,749,776 | 6/1988 | Sentman et al. ............. 528/336 |
| 4,801,748 | 1/1989 | Murahashi et al. .......... 564/126 |
| 4,942,220 | 7/1990 | Murahashi et al. .......... 528/336 |
| 5,109,104 | 4/1992 | Marks ........................... 528/313 |
| 5,185,427 | 2/1993 | Marks ........................... 528/329.1 |
| 5,298,598 | 3/1994 | Yuo et al. ..................... 528/336 |
| 5,596,070 | 1/1997 | Gotz ............................. 528/310 |
| 5,627,257 | 5/1997 | Leihr ............................ 528/335 |
| 5,674,974 | 10/1997 | Brearley et al. ............. 528/340 |

FOREIGN PATENT DOCUMENTS

| | | | |
|---|---|---|---|
| 44 18 540 A1 | 5/1994 | Germany .................. | C08G 69/28 |
| 196 35 077 A1 | 8/1996 | Germany .................. | C08G 69/00 |
| 1260755 | 2/1969 | United Kingdom ...... | C07C 63/26 |
| 1377333 | 2/1973 | United Kingdom ...... | C07C 63/00 |
| WO98/08889 A2 | 3/1998 | WIPO ......................... | C08G 60/00 |

*Primary Examiner*—P. Hampton-Hightower
*Attorney, Agent, or Firm*—Shanks & Herbert

[57] ABSTRACT

A process for the hydrolysis of a dinitrile (e.g., adiponitrile) utilizing from 0.1 to 500 mmoles of catalyst (e.g., a mixture of phosphorous acid and calcium hypophosphite) per mole of the dinitrile and in the presence of from 0.01 to 0.5 moles of a dicarboxylic acid cocatalyst (e.g., adipic acid) followed by addition of a diamine (e.g., hexamethylenediamine) and heating to produce polymerization. Such a process is particularly useful in the production of nylon 6,6 having a low BHMT content and improved melt stability.

6 Claims, No Drawings

PROCESS FOR THE HYDROLYSIS OF ADIPONITRILE AND THE PRODUCTION OF NYLON 6,6 UTILIZING LOW CATALYST LEVELS

CROSS-REFERENCE TO RELATED APPLICATIONS

"Not Applicable"

STATEMENT REGARDING FEDERALLY SPONSORED RESEARCH OR DEVELOPMENT

"Not Applicable"

BACKGROUND OF THE INVENTION

1. Field of the Invention

This invention relates to a process for the hydrolysis of adiponitrile and production of nylon 6,6. More specifically, the invention relates to the catalytic hydrolysis of adiponitrile at low catalyst levels.

2. Description of Related Art

Polyamides are currently produced commercially from dicarboxylic acids and diamines. For example, nylon 6,6 is commercially produced from adipic acid and hexamethylenediamine. Alternate routes to these materials have been explored within the art. For example, the art has taught processes to produce nylon 6,6 from adiponitrile and hexamethylenediamine. U.S. Pat. No. 2,245,129 discloses a process to produce polyamides by reacting adiponitrile, hexamethylenediamine, and water at high temperatures and pressures. A modified process to react adiponitrile with hexamethylenediamine and water was disclosed in U.S. Pat. No. 3,847,876. Catalysts were introduced into the processes to promote this reaction as disclosed by U.S. Pat. Nos. 4,490,521; 4,542,205; 4,603,192; 4,725,666; 4,749,776; 4,436,898; and 4,528,362. U.S. Pat. No. 4,501,881 discloses a process to form polyamides from adiponitrile, hexamethylenediamine, adipic acid and water. A significant shortcoming of these before mentioned processes to produce polyamides from adiponitrile and hexamethylenediamine is the production of significant levels of the dimer of the aliphatic diamine. In the case of hexamethylenediamine, the dimer product would be bis(hexamethylene)triamine (BHMT). As taught in U.S. Pat. No. 4,739,035 and U.S. Pat. No. 5,627,257 the diamine dimerization is promoted by the high temperatures and pressures required by the processes. These as formed diamine dimers or triamines serve as crosslinkers for the linear polyamide chain. The resultant gel content has been found to lead to significant product quality deterioration.

This shortcoming was partially overcome through a two step process disclosed in U.S. Pat. No. 4,739,035. The first step involved the hydrolysis of adiponitrile with water, catalysts and from 0 to 10 weight percent of the total hexamethylenediamine needed for the reaction. The second step consisted of adding the remainder of the hexamethylenediamine followed by polymerization. Such a two step process provided triamine levels in the 560 to 1,300 ppm levels versus the 1,420 to 1,610 ppm levels found through the teachings of other background art.

This shortcoming was more fully overcome through a further two step process disclosed in U.S. Pat. No. 5,627,257. The first step consisted of the nearly full hydrolysis of the adiponitrile to adipic acid utilizing a catalyst and a cocatalyst. The cocatalyst was described as a saturated aliphatic or aromatic dicarboxylic acid. The second step consisted of the addition of at least an equimolar amount of diamine followed by polymerization. Through use of this process, they were able to achieve triamine levels between 500 and 600 ppm. A shortcoming of this process was the substantial amounts of catalyst utilized. The level of the catalyst exemplified ranged from about 1 to 1.5 weight percent based on the adiponitrile level. For example, the patent teaches the use of 5 grams of orthophosphorous acid and 1.8 grams of calcium hypophosphite catalyst in the hydrolysis of 487 grams of adiponitrile, (see U.S. Pat. No. 5,627,257, Example 1).

BRIEF SUMMARY OF THE INVENTION

The present invention overcomes the shortcomings of the background art providing polyamides with low levels of triamine impurities without the need for substantial amounts of catalysts. The present invention provides a two step process (i.e., nitrile hydrolysis followed by the addition of the diamine and polymerization) utilizing low levels of catalysts. The polyamide product of the invention has been found to have enhanced melt stability when compared to two step processes of the background art which utilize significantly higher levels of catalysts, (see, for example, U.S. Pat. No. 5,627,257).

One aspect of the present invention involves the hydrolysis of nitriles through a process which incorporates low levels of catalysts. This process involves heating the nitrile, water, a cocatalyst, and a catalyst in the temperature range of 200 to 300° C. Surprisingly it has been found that this process provides essentially complete nitrile hydrolysis without the need of the high levels of catalyst required in the above mentioned background art.

A further aspect of the present invention comprises the use of the as formed nitrile hydrolysate in the production of polyamides. This was performed by adding the diamine to the hydrolysate followed by heating and polymerization. Surprisingly the produced polyamides of the present invention have been found to have enhanced melt stability when compared to those produced with background art levels of catalysts.

Thus, the present invention provides an improved process for producing polyamide comprising the steps of: (a) reacting a dinitrile containing 2 to 20 carbon atoms with at least a stoichiometric amount of water in the presence of from 0.1 to 500 mmoles of catalyst per mole of the dinitrile and in the presence of from 0.01 to 0.5 moles of a dicarboxylic acid cocatalyst at a temperature from 200 to 300° C. in the absence of air for a time sufficient for at least 95 mole % of the dinitrile to undergo hydrolysis and form a hydrolysate; (b) adding a diamine to the hydrolysate formed in step (a). wherein the amount of diamine is within 10 mole % of equimolar based on the starting amount of dinitrile; (c) heating the hydrolysate and diamine mixture in the presence of water for a time sufficient to polymerize; and then (d) recovering polyamide characterized by low triamine content and improved melt stability. In one embodiment of the process the dinitrile is selected from the group consisting of adiponitrile, suberonitrile, sebaconitrile, 1,12-dodecane dinitrile, terephthalonitrile, and methyl glutaronitrile, the catalyst is selected from the group consisting of phosphoric acid, phosphorous acid, hypophosphorous acid, pyrophosphoric acid, sodium hypophosphite hydrate, manganese(II) hypophosphite monohydrate, calcium hypophosphite, sulfuric acid, sulfamic acid, sodium bisulfate, ammonium hydrogen sulfate, phosphotungstic acid hydrate, phosphomolybdic acid hydrate, zinc acetate dihydrate, zinc sulfate heptahydrate, copper(II)acetate monohydrate, calcium acetate, acetic acid, glycolic acid, lanthanum trifluoromethanesulfonate, manganese(II)acetate tetrahydrate, cetyltrimethylammonium bromide, 12-molybdosilicic acid hydrate and mixtures thereof, the cocatalyst is selected from the group consisting of aliphatic and aromatic dicarboxylic acids having from 2 to 20 carbons and mixtures thereof, and the diamine is selected from the group consisting of hexamethylenediamine, tetramethylenediamine, 1,12-dodecane diamine, and p-xylene diamine. Preferably, the dinitrile is adiponitrile, the diamine is hexamethylenediamine, the catalyst is a mixture of phosphorous acid and calcium hypophosphite and the dicarboxylic acid is adipic acid and wherein the recovered polyamide (nylon 6,6) is characterized by a BHMT content of below 1,000 ppm.

DETAILED DESCRIPTION OF INVENTION

One aspect of the present invention involves the hydrolysis of nitriles through a process which employs low levels of catalysts. This process involves heating the nitrile, water, a cocatalyst and a catalyst in the temperature range of 200 to 300° C. Surprisingly it has been found that this process provides essentially complete nitrile hydrolysis without the need of the high levels of catalyst required in the above mentioned background art.

In the present invention, nitrile is meant to include any material which incorporates a nitrile functionality. Preferably, the nitrile will be a dinitrile containing from 2 to 20 carbons. The dinitrile may be aliphatic, straight chain or branched, or aromatic. The dinitrile may contain other functionalities. Specific examples of dinitriles which may find use within the present invention include adiponitrile, suberonitrile, sebaconitrile, 1,12-dodecane dinitrile, terephthalonitrile, methyl glutaronitrile, and the like. More preferably, the dinitrile is adiponitrile.

Water is used in the present invention both as a reactant in the hydrolysis of the nitrile and as a processing aid in the polymerization. The amount of water required in the nitrile hydrolysis step should be at least equal in stoichiometry to the amount of nitrile to be hydrolyzed.

The catalyst component of the present invention may include any substance which promotes the hydrolysis of nitriles, and/or the polymerization of the resultant hydrolysate with diamines to form polyamides. The intimate functional details of the catalyst are not fully known. These may include catalysts identified within the background art, above. Representative classes of catalysts may include oxygen-containing phosphorus compounds, oxygen-containing boron compounds, oxygen-containing sulfur compounds, metal-containing compounds, such as copper or manganese, aliphatic and aromatic carboxylic acids, Lewis acids and the like. Specific examples of catalysts include phosphoric acid, phosphorous acid, hypophosphorous acid, pyrophosphoric acid, sodium hypophosphite hydrate, manganese(II) hypophosphite monohydrate, calcium hypophosphite, sulfuric acid, sulfamic acid, sodium bisulfate, ammonium hydrogen sulfate, phosphotungstic acid hydrate, phosphomolybdic acid hydrate, zinc acetate dihydrate, zinc sulfate heptahydrate, copper(II)acetate monohydrate, calcium acetate, acetic acid, glycolic acid, lanthanum trifluoromethanesulfonate, manganese(II)acetate tetrahydrate, cetyltrimethylammonium bromide, 12-molybdosilicic acid hydrate, mixtures of the same and the like. An effective amount of catalyst to promote the hydrolysis is needed in the present invention. The effective amount of catalyst will depend on the catalyst type. Typically this falls within the range of 0.10 to 500 mmole of catalyst based on one mole of dinitrile.

The cocatalyst component of the present invention includes aliphatic and aromatic dicarboxylic acids. The dicarboxylic acids may contain from 2 to 20 carbons. Specific examples include adipic acid and terephthalic acid, but this should not be considered limiting. An effective amount of the cocatalyst to promote the hydrolysis is needed in the present invention. The effective amount of cocatalyst will depend on the cocatalyst type, hydrolysis process conditions and the like. Typically the level of the cocatalyst may range from about 1 to 50 mole percent of cocatalyst based on dinitrile. Preferably, this falls within the range of about 5 to 20 mole percent of cocatalyst based on dinitrile.

The hydrolysis process involves heating the nitrile, water, cocatalyst and a catalyst in the temperature range of 200 to 300° C. The reactor design is not critical. The reactor may be a stirred autoclave, an unstirred autoclave, a column reactor, a tube reactor, a loop reactor and the like. The process is generally run in the absence of air. The air may be removed by any known process. Examples include purging the reactor with inert gases, such as nitrogen or argon, evacuating the reactor and filling it with inert gases, pressurizing the reactor with inert gases followed by venting to 1 atmosphere, and the like. The processes may repeated as many times as desired. The temperature range of the process is determined by the rate of the hydrolysis reaction. At temperatures below 200° C., the rate of the hydrolysis reaction is generally too low to be economically useful. At temperatures above 300° C., significant amounts of byproducts may be formed. The reaction temperature may remain constant throughout the course of the reaction or may be varied. The reaction pressure may be within the range of about 25 to 1,000 psig. The reaction pressure may be controlled by the amount of water added, the temperature, the vent setting or a combination of the same. The length of the hydrolysis process will be a function of the reaction temperature, process design, reaction catalyst type and level and the like. The time should be long enough to effectively hydrolyze at least 95 mole percent of the nitrile. Preferably, the time should be long enough to effectively hydrolyze al least 98 mole percent of the nitrile.

A further aspect of the present invention comprises the use of the as formed nitrile hydrolysate in the production of polyamides. This was performed by adding the diamine to the hydrolysate followed by heating and polymerization. Surprisingly the produced polyamides of the present invention have been found to have significantly enhanced melt stability.

In the present invention, diamine is meant to include any material which incorporates two amine functions. Preferably, the diamine will contain from 2 to 20 carbons. The diamine may be aliphatic, straight chain or branched, or aromatic. The diamine may contain other functionalities. Specific examples of diamines which may find use in the present invention include hexamethylenediamine, tetramethylenediamine, 1,12-dodecane diamine, and p-xylene diamine. The diamine should be added at a level of within 10 mole percent of equimolar based on the nitrile. The exact level will be determined by the molecular weight desired, the reactor design, losses of the nitrile during the hydrolysis process, losses of diamine during the polymerization process and the like.

Other substances may be added with the diamine. Examples of the substances may include water, stabilizers, polymerization catalysts, processing aids and the like.

The polymerization process involves heating the nitrile hydrolysate, diamine, and water in the temperature range of 200 to 350° C. The reactor design is not critical. The reactor may be the same reactor design used for the hydrolysis process or may be different. The reactor may be a stirred autoclave, an unstirred autoclave, a column reactor, a tube reactor, a loop reactor, or the like. The process is generally run in the absence of air. The air may be removed by any known process. Examples include purging the reactor with inert gases, such as nitrogen or argon, evacuating the reactor and filling it with inert gases, pressurizing the reactor with inert gases followed by venting to 1 atmosphere and the like. These processes may be repeated as many times as desired. The temperature range of the process is determined by the rate of the polymerization and the melting point of the product polymer. The temperature will generally be in the range of 200 to 350° C. The pressure in the polymerization process may be in the range of 0 to 1,000 psig or may be performed under vacuum. The pressure may be constant throughout the polymerization process or may be varied. Generally the pressure will be reduced during the polymerization process. The polymerization process will require a sufficient time to form polymer. This time will be a function of the specific reactants, the product desired, the reaction temperature, the reaction pressure, and the like. Generally the polymerization process will require from 0.1 to 10 hours. In the background art (e.g., U.S. Pat. No 3,847,876), it has been taught that to produce high molecular weight polyamides, the polymerization should be conducted within specific temperature/pressure stages. The specific temperature/pressure profile will generally depend on the specific reactants used and the product desired. In the present invention with the adiponitrile hydrolysate and hexamethylene diamine, it has been generally found that the polymerization process may include heating the reactants to 250 to 310° C. with pressures between 200 and 300 psig, (set by the vent), followed by reducing the pressure and finishing in the temperature range of about 250 to 310° C. This should not be considered limiting.

In the following Examples adiponitrile hydrolysis level and products were determined by high pressure liquid chromatography (HPLC) analysis. Relative viscosity (RV) of the polymer samples was determined as a 8.4 weight percent polymer solution in 90.0% formic acid. Polyamide end group analysis was determined by titration. And, bis(hexamethylene)triamine (BHMT) levels were determined by gas chromatography (GC) analysis of the polyamide hydrolysate, all as generally known in the art.

COMPARATIVE EXAMPLE C1

A mixture of adiponitrile (150.00 grams), water (125.00 grams), phosphorous acid (0.075 grams), and calcium hypophosphite (0.027 grams), was added to a 1 liter stainless steel autoclave at room temperature. The autoclave was pressurized to 60 psig with nitrogen and then the pressure was released. This operation was repeated for a total of 6 times. With stirring, the autoclave was heated to 270° C. After achieving 270° C., a peak autogenous pressure of 635 psig was observed. During the course of this operation the pressure slowly reduced to 481 psig observed at the end. After 2 hours at 270° C., the autoclave was allowed to cool to room temperature. The contents of the autoclave were analyzed by high pressure liquid chromatography (HPLC) with the results shown below in Table 1.

TABLE 1

Product Analysis.

| Example | Adipamide (wt. %) | Adipamic Acid (wt. %) | 5-Cyano Valeramide (wt. %) | Adipic Acid (wt. %) | 5-Cyano Valeric Acid (wt. %) |
|---|---|---|---|---|---|
| C1 | 13.7 | 25.1 | 16.4 | 6.4 | 16.3 |
| 1 | 22.6 | 21.6 | ND | 6.2 | ND |
| 2 | 23.8 | 27.6 | 0.8 | 5.8 | ND |

"ND" signifies that the material was not detected.
Reported results represent the average of two determinations.

EXAMPLE 1

A mixture of adiponitrile (150.00 grams), water (125.00 grams), phosphorous acid (0.075 grams), calcium hypophosphite (0.027 grams), and adipic acid (22.50 grams) was added to a 1 liter stainless steel autoclave at room temperature. The autoclave was pressurized to 60 psig with nitrogen and the pressure was then released. This operation was repeated for a total of 6 times. With stirring, the autoclave was heated to 270° C. After achieving 270° C., a peak autogenous pressure of 621 psig was observed. After 2 hours at 270° C., the autoclave was allowed to cool to room temperature. The contents of the autoclave were analyzed by HPLC with the results shown above in table 1.

EXAMPLE 2

A mixture of adiponitrile (150.00 grams), water (125.00 grams), phosphorous acid (0.075 grams), calcium hypophosphite (0.027 grams), and adipic acid (22.50 grams) was added to a 1 liter stainless steel autoclave at room temperature. The autoclave was pressurized to 60 psig with nitrogen and the pressure was then released. This operation was repeated for a total of 6 times. With stirring, the autoclave was heated to 270° C. After achieving 270° C., a peak autogenous pressure of 590 psig was observed. After 2 hours at 270° C., the autoclave was allowed to cool to room temperature. The contents of the autoclave were analyzed by HPLC with the results shown above in table 1.

EXAMPLE 3

A mixture of adiponitrile (100.00 grams), water (80.00 grams), phosphorous acid (0.050 grams), calcium hypophosphite (0.018 grams), and adipic acid (15.00 grams) was added to a 400 cc stainless steel shaker tube at room temperature. The shaker tube was pressurized to 60 psig with nitrogen and the pressure was then released. This operation was repeated for a total of 6 times. With shaking, the shaker tube was heated to 230° C. After 5 hours at 230° C., the shaker tube was allowed to cool to room temperature. The contents of the shaker tube were analyzed by HPLC with the results shown below in Table 2.

TABLE 2

Product Analysis.

| Example | Adipamide (wt. %) | Adipamic Acid (wt. %) | 5-Cyano Valeramide (wt. %) | Adipic Acid (wt. %) | 5-Cyano Valeric Acid (wt. %) |
|---|---|---|---|---|---|
| 3 | 30.1 | 33.0 | 0.9 | 7.2 | 0.7 |
| 4 | 33.1 | 32.3 | 0.2 | 6.3 | ND |

TABLE 2-continued

| | Product Analysis. | | | | |
|---|---|---|---|---|---|
| Example | Adipamide (wt. %) | Adipamic Acid (wt. %) | 5-Cyano Valeramide (wt. %) | Adipic Acid (wt. %) | 5-Cyano Valeric Acid (wt. %) |
| 5 | 14.8 | 26.4 | 0.1 | 10.1 | 0.2 |
| 6 | 15.5 | 25.8 | 0.3 | 9.9 | 0.2 |

"ND" signifies that the materials was not detected.
Reported results represent the average of two determinations.

EXAMPLE 4

A mixture of adiponitrile (100.00 grams), water (80.00 grams), phosphorous acid (0.050 grams), calcium hypophosphite (0.018 grams), and adipic acid (15.00 grams) was added to a 400 cc stainless steel shaker tube at room temperature. The shaker tube was pressurized to 60 psig with nitrogen and the pressure was then released. This operation was repeated for a total of 6 times. With shaking, the shaker tube was heated to 230° C. After 8 hours at 230° C., the shaker tube was allowed to cool to room temperature. The contents of the autoclave were analyzed by HPLC with the results shown above in Table 2.

EXAMPLE 5

A mixture of adiponitrile (100.00 grams), water (166.60 grams), phosphorous acid (0.050 grams), calcium hypophosphite (0.018 grams), and adipic acid (15.00 grams) was added to a 400 cc stainless steel shaker tube at room temperature. The shaker tube was pressurized to 60 psig with nitrogen and the pressure was then released. This operation was repeated for a total of 6 times. With shaking, the shaker tube was heated to 250° C. After 3 hours at 250° C., the shaker tube was allowed to cool to room temperature. The contents of the shaker tube were analyzed by HPLC with the results shown above in Table 2.

EXAMPLE 6

A mixture of adiponitrile (100.00 grams), water (166.60 grams), phosphorous acid (0.050 grams), calcium hypophosphite (0.018 grams), and adipic acid (15.00 grams) was added to a 400 cc stainless steel shaker tube at room temperature. The shaker tube was pressurized to 60 psig with nitrogen and the pressure was then released. This operation was repeated for a total of 6 times. With shaking, the shaker tube was heated to 250° C. After 5 hours at 250° C., the shaker tube was allowed to cool to room temperature. The contents of the shaker tube were analyzed by HPLC with the results shown above in Table 2.

COMPARATIVE EXAMPLE C2 AND EXAMPLES 7 TO 28

A mixture of adiponitrile (100.00 grams), water (90.00 grams), adipic acid (13.51 grams), and the catalyst listed below in Table 3 was added to a 400 cc stainless steel shaker tube at room temperature. The shaker tube was pressurized to 60 psig with nitrogen and the pressure was then released. This operation was repeated for a total of 6 times. With shaking, the shaker tube was heated to 230° C. After 5 hours at 230° C., the shaker tube was allowed to cool to room temperature. The contents of the shaker tube were analyzed by HPLC with the results shown below in Table 4.

TABLE 3

| Example | Catalyst Amount (grams) |
|---|---|
| C2 | None |
| 7 | 0.025 Phosphorous acid, and 0.009 Calcium hypophosphite |
| 8 | 0.005 Phosphorous acid, and 0.002 Calcium hypophosphite |
| 9 | 0.050 Phosphorous acid |
| 10 | 0.104 Calcium hypophosphite |
| 11 | 0.070 Ammonium Hydrogensulfate |
| 12 | 0.107 Calcium acetate monohydrate |
| 13 | 0.061 Calcium carbonate |
| 14 | 0.050 Cetyltrimethylammonium bromide |
| 15 | 0.111 Copper(II)acetate monohydrate |
| 16 | 0.046 Glycolic acid |
| 17 | 0.081 Hypophosphorous acid |
| 18 | 0.149 Manganese(II)acetate tetrahydrate |
| 19 | 0.124 Manganese(II)hypophosphite monohydrate |
| 20 | 0.10 Lanthanum trifluoromethanesulfonate |
| 21 | 0.070 Phosphoric acid |
| 22 | 0.114 2-(2'-pyridyl)ethylphosphonic acid |
| 23 | 0.109 Pyrophosphoric acid |
| 24 | 0.050 Sodium bisulfite |
| 25 | 0.054 Sodium hypophosphite hydrate |
| 26 | 0.059 Sulfamic acid |
| 27 | 0.134 Zinc acetate dihydrate |
| 28 | 0.175 Zinc sulfate heptahydrate |

TABLE 4

| | Product Analysis. | | | | |
|---|---|---|---|---|---|
| Example | Adipamide (wt. %) | Adipamic Acid (wt. %) | 5-Cyano Valeramide (wt. %) | Adipic Acid (wt. %) | 5-Cyano Valeric Acid (wt. %) |
| C2 | 30.1 | 32.6 | 1.2 | 7.5 | ND |
| 7 | 22.5 | 33.3 | 1.2 | 9.1 | ND |
| 8 | 25.9 | 32.6 | 0.6 | 8.3 | ND |
| 9 | 28.7 | 31.8 | 1.1 | 7.6 | ND |
| 10 | 25.6 | 32.7 | 0.4 | 8.1 | ND |
| 11 | 29.2 | 33.0 | 1.0 | 7.5 | ND |
| 12 | 33.1 | 32.2 | 0.6 | 6.8 | ND |
| 13 | 28.2 | 32.2 | 1.1 | 7.6 | ND |
| 14 | 28.8 | 31.9 | 0.6 | 7.5 | ND |
| 15 | 28.3 | 32.9 | 0.7 | 7.8 | ND |
| 16 | 25.9 | 32.5 | 0.6 | 8.12 | ND |
| 17 | 21.0 | 23.7 | 0.6 | 5.3 | ND |
| 18 | 34.5 | 30.2 | 0.6 | 6.6 | ND |
| 19 | 27.4 | 32.7 | 0.9 | 7.9 | ND |
| 20 | 28.3 | 32.3 | 0.6 | 7.6 | ND |
| 21 | 34.5 | 30.3 | 0.9 | 6.6 | ND |
| 22 | 32.9 | 28.4 | 0.5 | 6.5 | 0.6 |
| 23 | 38.3 | 30.5 | 0.9 | 5.8 | ND |
| 24 | 30.7 | 28.6 | 0.4 | 6.6 | 1.5 |
| 25 | 29.2 | 28.3 | 1.0 | 6.6 | 0.5 |
| 26 | 28.7 | 28.9 | 0.5 | 7.0 | ND |
| 27 | 33.2 | 28.0 | 0.8 | 5.9 | ND |
| 28 | 32.2 | 26.8 | 0.4 | 5.9 | ND |

"ND" signifies that the material was not detected.
Reported results represent the average of two determinations.

COMPARATIVE EXAMPLE C3

A mixture of adiponitrile (40.00 grams), water (33.26 grams), phosphorous acid (0.41 grams), calcium hypophosphite (0.15 grams), and adipic acid (6.00 grams) was added to a 300 cc stainless steel autoclave. The autoclave was pressurized to 300 psig with nitrogen and then the pressure was released. This operation was repeated for a total of 3 times. The autoclave was pressurized to 300 psig with nitrogen and then the pressure was vented down to 40 psig nitrogen and heated to 230° C. with stirring. After 6 hours at 230° C., the autoclave was allowed to cool to room temperature. The autoclave was opened and hexamethylenediamine, (68.46 grams of a 69.76 weight percent aqueous hexamethylenediamine solution) was added. The autoclave was resealed. The autoclave was pressurized to 300 psig with nitrogen and then the pressure was released. This operation was repeated for a total of 3 times. The autoclave was pressurized to 300 psig with nitrogen and then the pressure was vented to 10 psig nitrogen. With stirring, the autoclave was heated to 270° C. with the vent set at 200 psig. After achieving 270° C., the pressure was reduced down to atmospheric pressure over 20 minutes. The polymerization was finished at atmospheric pressure at 270° C. for 20 minutes and then the autoclave was allowed to cool to room temperature. The resulting product was analyzed for relative viscosity, (RV), end groups and bis(hexamethylene)triamine (BHMT) level with the results shown below in Table 5.

The product was then subjected to a melt stability test. This melt stability test was performed as follows. The product was dried at 80° C. overnight in a vacuum oven, (p=20 inches Hg), with a slight nitrogen purge. Five grams of the product was then melted with stirring for 10 minutes at 285° C. under a nitrogen atmosphere. The resulting material was allowed to cool to room temperature, isolated, and analyzed for relative viscosity (RV). The results are summarized below in Table 6.

TABLE 5

Polymer Analytical Results.

| Example | RV | End Group Amine Analysis (moles/million grams polymer) | Acid Analysis (moles/million grams polymer) | BHMT (ppm) |
|---------|----|--------|--------|------|
| C3 | 49 | 28, 86 | 30 | 47 |
| 29 | 54 | 38 | 39 | 249 |

TABLE 6

Melt Stability Results.

| Example | Original RV | Melt-Treated RV |
|---------|-------------|-----------------|
| C3 | 49 | 104 |
| 29 | 54 | 45 |

EXAMPLE 29

A mixture of adiponitrile (40.00 grams), water (33.26 grams), phosphorous acid (0.0205 grams), calcium hypophosphite (0.0075 grams), and adipic acid (6.00 grams) was added to a 300 cc stainless steel autoclave. The autoclave was pressurized to 300 psig with nitrogen and then the pressure was released. This operation was repeated for a total of 3 times. The autoclave was pressurized to 300 psig with nitrogen and then the pressure was vented to 10 psig nitrogen and heated to 230° C. with stirring. After 6 hours at 230° C., the autoclave was allowed to cool to room temperature. The autoclave was opened and hexamethylenediamine (68.46 grams of a 69.76 weight percent aqueous hexamethylenediamine solution) was added. The autoclave was resealed. The autoclave was pressurized to 300 psig with nitrogen and then the pressure was released. This operation was repeated for a total of 3 times. The autoclave was pressurized to 300 psig with nitrogen and then the pressure was vented to 10 psig nitrogen. With stirring, the autoclave was heated to 270° C. with the vent set at 200 psig. After achieving 270° C., the pressure was reduced down to atmospheric pressure over 20 minutes. The polymerization was finished at atmospheric pressure at 270° C. for 20 minutes and then the autocleve was allowed to cool to room temperature. The resulting product was analyzed for relative viscosity, (RV), end groups and bis(hexamethylene)triamine (BHMT) level with the results shown above in Table 5.

The product was then subjected to a melt stability test as described above for Comparative Example C3, with the results summarized above in Table 6.

EXAMPLE 30

A mixture of adiponitrile (2353 grams), water (1958 grams), phosphorous acid (1.21 grams), calcium hypophosphite (0.44 grams), and adipic acid (353 grams) was added to a 35 gallon stainless steel autoclave. The autoclave was flushed with nitrogen and heated to 230° C. with stirring. After 6 hours at 230° C., the autoclave was allowed to cool to room temperature. The autoclave was opened and a small sample of the hydrolysate was analyzed by HPLC and found to contain 11.8 weight percent adipamide, 61.3 weight percent adipamic acid, no detectable amount of 5-cyanovaleramide, 26.9 weight percent adipic acid, and no detectable amount of 5-cyanovaleric acid. Hexamethylenediamine, (3,383 grams of a 81.98 weight percent aqueous hexamethylenediamine solution), was added to the autoclave. The autoclave was resealed. The autoclave was flushed with nitrogen. With stirring, the autoclave was heated to 275° C. with the vent set at 250 psig. After achieving 275° C., the pressure was reduced down to atmospheric pressure over one hour. The polymerization was finished at atmospheric pressure at 275° C. for 30 minutes and then the autoclave was allowed to cool to room temperature. The resulting product was analyzed and found to have a relative viscosity (RV) of 60, 50 moles/million grams polymer amine end groups, 62 moles/million grams polymer acid end groups, and a bis(hexamethylene)triamine (BHMT) level of 903 ppm.

Having thus described and exemplified the invention with a certain degree of particularity, it should be appreciated that the following claims are not to be so limited but are to be afforded a scope commensurate with the wording of each element of the claim and equivalents thereof.

We claim:

1. A process for producing polyamide comprising the steps of:
   (a) reacting a dinitrile containing 2 to 20 carbon atoms with at least a stoichiometric amount of water in the presence of from 0.1 to 1.3 mmoles of catalyst to one mole of said dinitrile and in the presence of from 0.01 to 0.5 moles of a dicarboxylic acid cocatalyst at a temperature from 200 to 300° C. in the absence of air for a time sufficient for at least 95% of the dinitrile to undergo hydrolysis and form a hydrolysate;
   (b) adding a diamine to said hydrolysate formed in step (a) wherein the amount of diamine is within 10 mole % of equimolar based on the starting amount of dinitrile;
   (c) heating the hydrolysate and diamine mixture in the presence of water for a time sufficient to polymerize; and then
   (d) recovering polyamide having a triamine content of less than 1,000 ppm and improved melt stability.

2. A process of claim 1 wherein said dinitrile is selected from the group consisting of adiponitrile, suberonitrile, sebaconitrile, 1,12-dodecane dinitrile, terephthalonitrile, and methyl glutaronitrile, said catalyst is selected from the group consisting of phosphoric acid, phosphorous acid, hypophosphorous acid, pyrophosphoric acid, sodium hypophosphite hydrate, manganese(II)hypophosphite monohydrate, calcium hypophosphite, sulfuric acid, sulfamic acid, sodium bisulfate, ammonium hydrogen sulfate, phosphotungstic acid hydrate, phosphomolybdic acid hydrate, zinc acetate dihydrate, zinc sulfate heptahydrate, copper(II)acetate monohydrate, calcium acetate, acetic acid, glycolic acid, lanthanum trifluoromethanesulfonate, manganese(II)acetate tetrahydrate, cetyltrimethyammonium bromide, 12-molybdosilicic acid hydrate and mixtures thereof, said cocatalyst is selected from the group consisting of aliphatic and aromatic dicarboxylic acids having from 2 to 20 carbons and mixtures thereof, and wherein said diamine is selected from the group consisting of hexamethylenediamine, tetramethylenediamine, 1,12-dodecane diamine, and p-xylene diamine.

3. A process of claim 1, wherein said dinitrile is adiponitrile, said diamine is hexamethylenediamine, said catalyst is a mixture of phosphorous acid and calcium hypophosphite and said dicarboxylic acid is adipic acid and wherein said recovered polyamide is (nylon 6,6).

4. A process for producing polyamide comprising the steps of:
(a) reacting a dinitrile containing 2 to 20 carbon atoms with at least a stoichiometric amount of water in the presence of from 0.1 to 500 mmoles of catalyst to one mole of said dinitrile and in the presence of from 0.01 to 0.5 moles of a dicarboxylic acid cocatalyst at a temperature from 200 to 300° C. in the absence of air for a time sufficient for at least 95% of the dinitrile to undergo hydrolysis and form a hydrolysate;
(b) adding a diamine to said hydrolysate formed in step (a), wherein the amount of diamine is within 10 mole % of equimolar based on the starting amount of dinitrile;
(c) heating the hydrolysate and diamine mixture in the presence of water for a time sufficient to polymerize; and then
(d) recovering polyamide, wherein the polyamide has a triamine content of less than about 250 ppm.

5. The process of claim 4, wherein said dinitrile is selected from the group consisting of adiponitrile, suberonitrile, sebaconitrile, 1,2-dodecane dinitrile, terephtalonitrile, and methyl glutaronitrile, said catalyst is selected from the group consisting of phosphoric acid, phosphorous acid, hypophosphorous acid, pyrophosphoric acid, sodium hypophosphite hydrate, manganese (II) hypophosphite monohydrate, calcium hypophosphite, sulfuric acid, sulfamic acid, sodium bisulfate, ammonium hydrogen sulfate, phosphotungstic acid hydrate, phosphomolybdic acid hydrate, zinc acetate dihydrate, zinc sulfate heptahydrate, copper (II) acetate monohydrate, calcium acetate, acetic acid, glycolic acid, lanthanum trifluoromethanesulfonate, manganese(II) acetate tetrahydrate, cetyltrimethylammonium bromide, 12-molybdosilicic acid hydrate and mixtures thereof, said cocatalyst is selected from the group consisting of aliphatic and aromatic dicarboxylic acids having from 2 to 20 carbons and mixtures thereof, and wherein said diamine is selected from the group consisting of hexamethylenediamine, tetramethylenediamine, 1,12-dodecane diamine, and p-xylene diamine.

6. The process of claim 4, wherein said dinitrile is adiponitrile, said diamine is hexamethylenediamine, said catalyst is a mixture of phosphorous acid and calcium hypophosphite, and said dicarboxylic acid is adipic acid, wherein said polyamide is nylon 6,6.

* * * * *